(12) United States Patent
Shimazaki

(10) Patent No.: US 6,204,873 B1
(45) Date of Patent: Mar. 20, 2001

(54) COLOR CONVERSION ADJUSTMENT METHOD

(75) Inventor: Osamu Shimazaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/078,905

(22) Filed: May 14, 1998

(30) Foreign Application Priority Data

May 15, 1997 (JP) .................................... 9-126108

(51) Int. Cl.[7] ................................ B41J 2/32; H04N 1/46

(52) U.S. Cl. ......................... 347/172; 358/518; 358/523; 382/167

(58) Field of Search ........................ 347/172; 358/518, 358/519, 523; 382/167, 162

(56) References Cited

U.S. PATENT DOCUMENTS 6,088,475 * 7/2000 Nagashima et al. ................. 382/167

* cited by examiner

Primary Examiner—Huan Tran
(74) Attorney, Agent, or Firm—Sughrue, Mion, Zinn, Macpeak & Seas, PLLC

(57) ABSTRACT

A color conversion adjustment method is provided which enables correct judgment on a fine gray balance. In a process of adjusting or confirming gray correction conversion for correcting a gray balance, a plurality of color patches, whose gray balances are varied discretely, are lined up, and a gray correction chart, whose background portion other than the color patches is outputted at a black color of a predetermined density, is outputted. The black color of the background portion is a standard for judging the color balance. Because the color patches and the black color are printed on the same paper, there is no deterioration in the gray balance due to differences in papers, and accordingly, fine gray balance can be judged more accurately.

20 Claims, 15 Drawing Sheets

F I G. 5 A
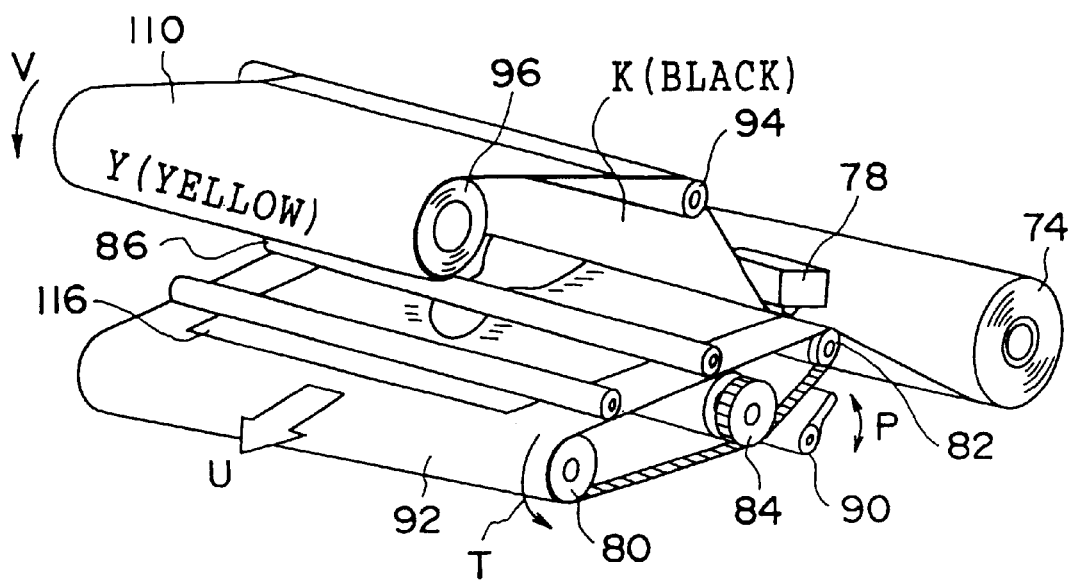
F I G. 5 B
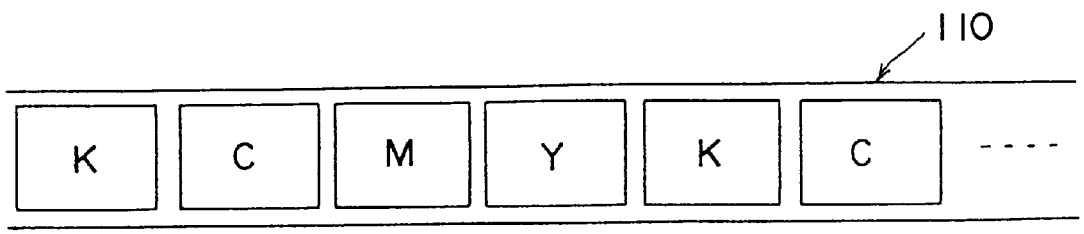

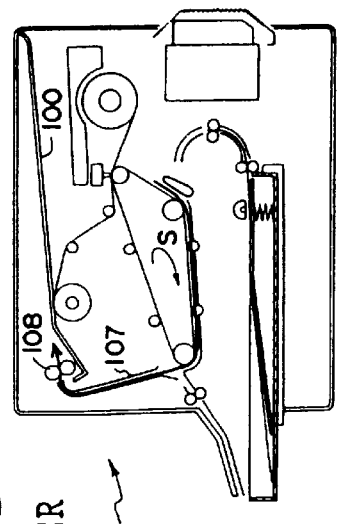
FIG. 6D START PAPER DISCHARGE
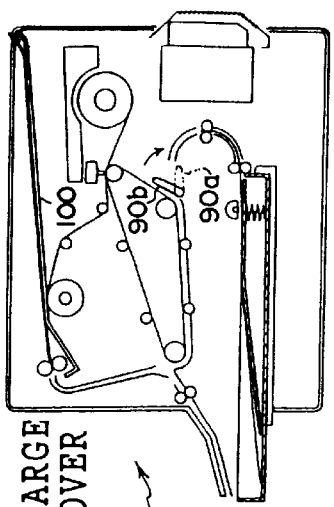
FIG. 6E FINISH DISCHARGE AND SWITCH OVER GUIDE LEVER
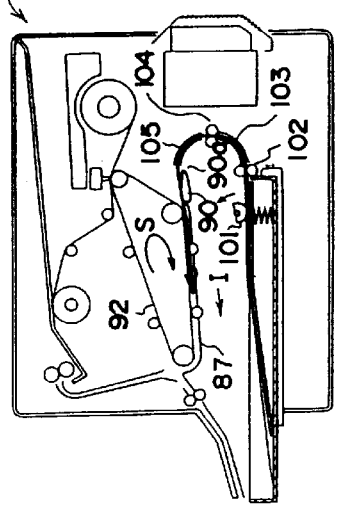
FIG. 6A PULL OUT PAPER FROM TRAY
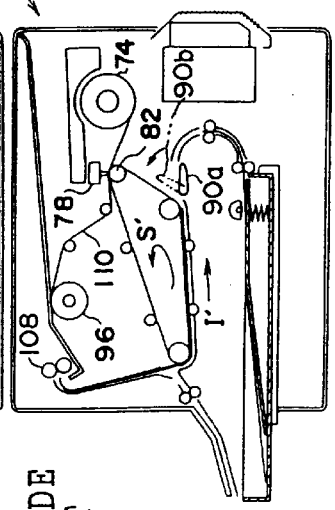
FIG. 6B SWITCH OVER GUIDE LEVER AND START HEAT-SENSING
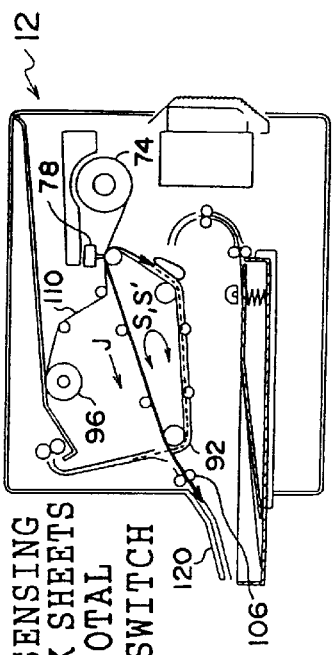
FIG. 6C REPEAT HEAT-SENSING ON EACH OF INK SHEETS C, M, Y, K FOR TOTAL FOUR TIMES (SWITCH BACK SYSTEM)

F I G. 8
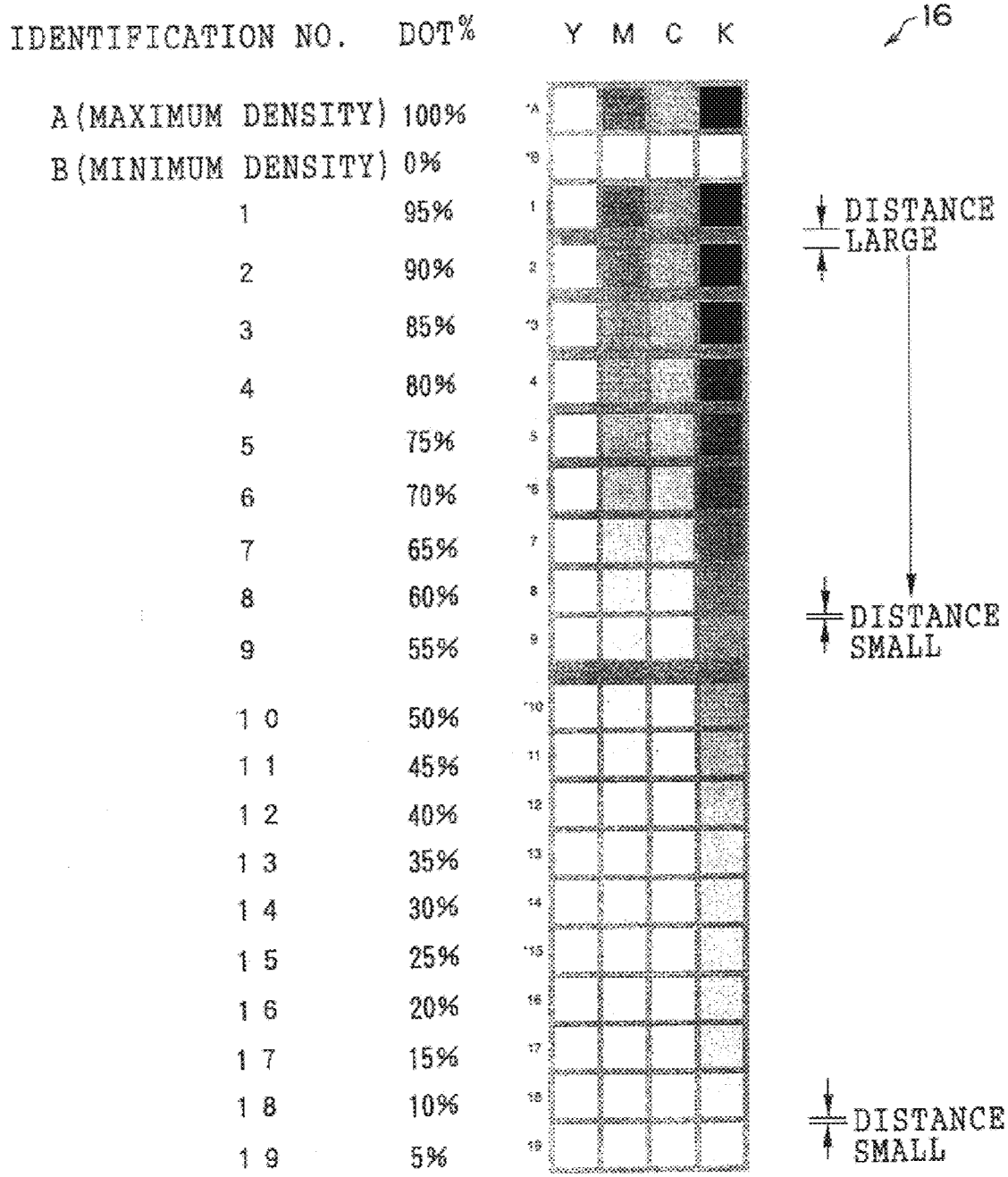

FIG. 10
EXAMPLES OF CONFIGURATION OF COLOR PATCH OF GRAY CORRECTION CHART
NORMAL CIRCLE
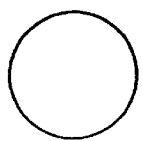
ELLIPSE
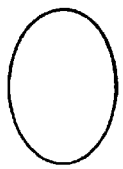
FIGURE OF RECTANGLE (SQUARE) WHOSE VERTEX ARE SMOOTHED
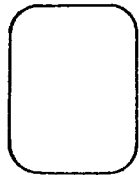
FIGURE IN WHICH TWO SEMI-CIRCLES ARE CONNECTED TO THE OPPOSING SIDES OF RECTANGLE (SQUARE)
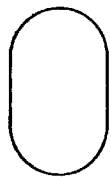
FIGURE OF RHOMBOID WHOSE VERTEX ARE SMOOTHED
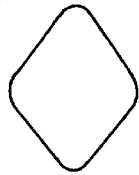
OVAL

DISPLAY SCREEN AT THE TIME OF DENSITY CALIBRATION

FIG. 14

DISPLAY SCREEN AT THE TIME
OF GRAY CORRECTION

```
╔══════════════ Gray adjustment ══════════════╗
║                                              ║
║    Ribbon : [              ▼]                ║
║                                              ║
║    ┌──────────────────────────────────┐      ║
║    │  OUTPUTTING OF REFERENCE CHART   │      ║
║    └──────────────────────────────────┘      ║
║                           Y          M       ║
║                                              ║
║    HIGHLIGHT CHART:     [+0.0]     [+0.0]    ║
║                                              ║
║    MIDDLE    CHART:     [+0.0]     [+0.0]    ║
║                                              ║
║    SHADOW    CHART:     [+0.0]     [+0.0]    ║
║                                              ║
║              [ CANCEL ]       [ REGISTER ]   ║
║                                              ║
╚══════════════════════════════════════════════╝
```

COLOR CONVERSION ADJUSTMENT METHOD

BACKGROUND OF THE INVENTION

1. Field of the Invention

The present invention relates to a color conversion adjustment method for a color printer which carries out gray correction conversion for correcting the gray balance for image data, and to a gray correction chart used at the time of adjusting or confirming gray correction conversion, and in particular, to a gray correction chart which determines colors of background portions other than color patches and to a color conversion adjustment method which uses a gray correction chart which determines background color of background portions other than color patches.

2. Description of the Related Art

In a color press which uses a rotary press or the like, a color print formed by a so-called dot image is formed. Before this color print is formed, a color print proof image is prepared in advance for a color printer having a simple structure, and correction of the color printing is carried out on the basis of this image. By using this color printer, there is no need to form a printing plate (PS plate), or a lithographic film or the like which are needed only when correction is carried out at the color press. Thus, a plurality of color print proof images can be prepared in a short period of time, and the correction work is made much more efficient.

Before the color print proof image for correction is formed, however, variations in density, which are caused by changes over time, intrinsic differences which occur as a matter of course among color printers of the same type, and the like need to be corrected. Namely, there is the need to carry out density calibration.

For example, in the case of a printer which is designed so as to have a standard gradation output density curve 140 as illustrated by the one-dot chain line in FIG. 15A, the output density curve 140 varies to, for example, an output density curve 142, illustrated by the solid line, due to intrinsic differences among individual printers or changes over time or the like. In this case, even if printer signal $P_1$ or $P_2$ is input to the data output section of the printer in order to obtain an output density of $D_1$ or $D_2$, the density which is actually outputted is $D_1'$ or $D_2'$, and in this state, a correct color print proof image cannot be outputted.

For example, a conversion curve 150, illustrated in FIG. 15B, is made use of to obtain the output density of the standard gradation. The printer signals $P_1$, $P_2$ are converted to signals $P_1'$, $P_2'$ by the conversion curve 150. As illustrated in FIG. 15A, the correct output densities $D_1$, $D_2$ are obtained by the signals $P_1'$, $P_2'$ being inputted to the printer data output section having the characteristic expressed by the output density curve 142.

Conventionally, such correction of color density was carried out by implementing, for example, the following steps.

Step 1: Outputting of Density Calibration Reference Chart

In step 1, a density calibration reference chart is printed (outputted) onto a first recording sheet. The density calibration reference chart is obtained by converting the dot percent data (dot % data) for each of C (cyan), M (magenta), Y (yellow), and K (black) in the chart data, by using a 4-D (four-dimensional) conversion table for color correction which is built-into the color printer. (Hereinafter, this table will be referred to as the "reference color conversion 4-D table".) In the density calibration reference chart, color patches for each of C, M, Y, K are printed (outputted) by changing the dot % density for each of C, M, Y, K in equal stages.

By comparing (color patches of) this density calibration reference chart with (color patches of) a reference calibration chart prepared in advance, the density difference between the actual printer output value and a theoretical value is obtained. A 1-D (one-dimensional) conversion table for density calibration for correcting this density difference is selected. (Hereinafter, this table will be referred to as the "density calibration 1-D table".)

Step 2: Outputting of Density Calibration Confirmation Chart.

In step 2, a density calibration confirmation chart is printed (outputted) onto a second recording sheet. The density calibration confirmation chart is obtained by converting chart data using the reference color conversion 4-D table and the density calibration 1-D table which was selected in step 1.

By using the outputted density calibration confirmation chart, it is confirmed that the density corrected by the density calibration 1-D table is equal to the reference density. Step 3: Outputting of Gray Correction Reference Chart In step 3, in order to confirm the fine gray balance at the time of combining the respective colors of C, M and Y whose densities have been corrected, a gray correction reference chart is printed (outputted) onto a third recording sheet. This gray correction reference chart is obtained by converting chart data for gray correction by using the reference color conversion 4-D table and the density calibration 1-D table selected in step 1. In this gray correction reference chart, for example, a plurality of color patches in which C is at a constant density and the densities of M and Y are varied bit-by-bit are disposed around a color patch in which C, M, and Y are combined at equal densities.

The color patch having the best gray balance is selected from the outputted gray correction reference chart. This color patch is compared with the color patch in which C, M and Y are combined at equal densities in order to determine the extent of the density difference in M and Y colors between these two color patches. The gray correction 1-D table is selected on the basis of this density difference.

Step 4: Outputting of Gray Correction Confirmation Chart.

In step 4, a gray correction confirmation chart is printed (outputted) onto a fourth recording sheet. The gray correction confirmation chart is obtained by converting the chart data for gray correction by using the following three tables: the reference color conversion 4-D table, the density calibration 1-D table selected in step 1, and gray correction 1-D table selected in step 3.

By using the outputted gray correction confirmation chart, it is confirmed that the gray balance, which has been corrected by the gray correction 1-D table, is optimal.

In this way, the color density and the gray balance are adjusted at the color printer. After adjustment, a color print proof image is printed on the basis of a combination table obtained by combining the reference color conversion 4-D table, the density calibration 1-D table selected in step 1, and the gray correction 1-D table selected in step 3. On the basis of this image, color correction of the color press is carried out.

However, in the above-described conventional method of adjusting a color conversion table, the judgment criteria for visually judging the fine color balance of the gray correction chart are not clearly prescribed. Therefore, there is a drawback in that objectivity in judging the gray balance cannot be ensured.

In order to overcome this drawback, there is a method in which a black color of a predetermined density is printed on a different paper than the gray correction chart, this black color is used as a reference for judging the gray balance. However, with this method, another recording sheet for the black color must be prepared, and therefore, the work efficiency deteriorates. Further, gray balance may deteriorate due to a difference in the paper used, however, when the deterioration of the gray correction chart paper is different to the deterioration of the black color paper, then the gray balance judgment is incorrect.

SUMMARY OF THE INVENTION

In view of the aforementioned, an object of the present invention is to provide a color conversion adjustment method and a gray correction chart which improve work efficiency and enable for a correct judgment on the fine gray balance.

In order to achieve this object, a first aspect of the present invention is a color conversion adjusting method for a color printer, comprising a first step which outputs a first chart for adjusting output of gray balance, and which adjusts gray output balance on the basis of the first chart, and a second step which outputs a second chart for confirming the results of the adjustment in the first step, and which confirms said results of the adjustment in the first step on the basis of the second chart, wherein each of the first chart and the second chart comprises a plurality of color patches which are outputted in a gray color in which at least two original colors, each of whose density is altered into a plurality of steps, are combined, and a background portion, which is a portion of the first chart or the second chart other than the plurality of color patches, the background portion being outputted as a black color.

A second aspect of the present invention is a color conversion adjusting method for a color printer, using a gray correction chart which is used for adjusting of output of gray balance of a color printer, comprising a plurality of color patches which are outputted in a gray color in which at least two original colors, each of whose density is altered into a plurality of steps, are combined, and a background portion, which is a portion of the first chart or the second chart other than the plurality of color patches, the background portion being outputted as a black color.

A third aspect of the present invention is a gray correction chart which is used for adjusting of output of gray balance of a color printer, comprising a plurality of color patches which are outputted in a gray color in which at least two original colors, each of whose density is altered into a plurality of steps, are combined, and a background portion, which is a portion of the first chart or the second chart other than the plurality of color patches, the background portion being outputted as a black color.

In accordance with the first, second and third aspects of the present invention, because a black color whose color layer is stable is outputted as a reference for judging a gray balance as a background color of the back ground portion other than the color patches of the gray correction chart, the gray balance can be judged accurately, there is no need to prepare another chart for the black color which is used as a reference for judging the gray balance, and accordingly, work efficiency can be improved. Due to the type of papers, the gray balance of a plurality of original colors other than a black color may deteriorate, and accordingly, the judgment of the gray balance may be incorrect. However, in the present invention, because the color patches and the black color are printed on the same paper, even in the case in which the gray balance deteriorates, because the gray balance of the original colors and the black color deteriorate in the same direction, it is possible to cancel out a difference in a reference for judging the gray balance as being due to a difference in papers. As a result, the gray balance can always be judged accurately.

BRIEF DESCRIPTION OF THE DRAWINGS

FIG. 5A is a partial view of a thermal printer according to the present, embodiment, and illustrates a perspective view of an ink sheet supplying-collecting system in the thermal printer, and heat sensitive paper transport system.

FIG. 5B is a partial view of a thermal printer according to the present embodiment, and illustrates each of the ink areas of the ink sheet.

FIG. 6A is a view which illustrates a heat sensitive paper transport path of the thermal printer according to the present embodiment at the time when the heat sensitive paper is pulled out from a paper tray.

FIG. 6B is a view which illustrates a transport path of the heat sensitive paper of the thermal printer according to the present embodiment at the time when heat sensing starts.

FIG. 6C is a view which illustrates the transport path of the heat sensitive paper of the thermal printer according to the present embodiment at the time when a switch-back system is implemented.

FIG. 6D is a view which illustrates the transport path of the heat sensitive paper of the thermal printer according to the present embodiment at the time when the paper is discharged.

FIG. 6E is a view of a transport path of a heat sensitive paper of a thermal printer according to the present embodiment when the discharging of the paper has been completed.

FIG. 8 is a view which illustrates an example of the formatting of a density calibration chart (a reference chart and a confirmation chart) according to the present embodiment.

FIG. 10 is a view which illustrates examples of the configuration of a color patch of the gray correction chart according to the present embodiment.

FIG. 14 is a view of the display screen of the editing device at the time of gray correction.

DESCRIPTION OF THE PREFERRED EMBODIMENTS

A description of an embodiment according to the present invention will be given hereinafter with reference to the drawings.

Figure 1:
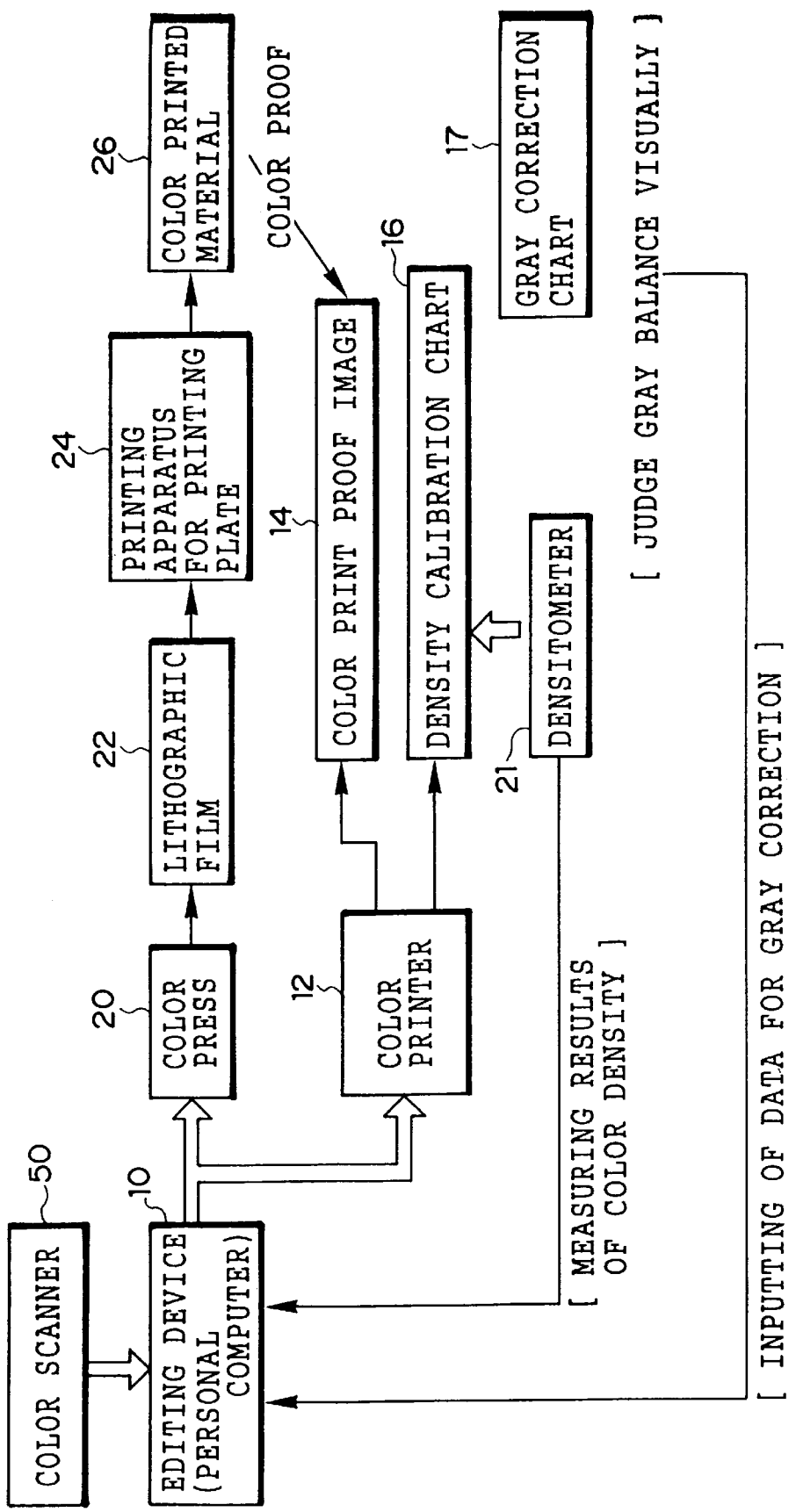
FIG. 1 is a view which illustrates an example of the system structure for forming a color print proof image and a color print.

An example of a system structure for forming a color print proof image and a color print is shown in FIG. 1. As shown in FIG. 1, the system for forming the color print proof image comprises a color printer 12 which outputs a color print proof image 14 for correction by carrying out color correction by color conversion in a plurality of steps, and an editing device 10 which functions as a high-ordered device of the color printer 12. As will be described later, a compact printer having a simple structure, for example, a thermal printer can be used as the color printer 12.

For example, a personal computer can be used for the editing device 10. Accordingly, color conversion adjustment work (color density adjustment) by the color printer 12 which is connected to a low-ordered device can be facilitated.

At the time of density calibration which is the first step of the color density adjustment, the color printer 12 outputs a density calibration chart 16 in which either variations of color density caused by intrinsic differences among individual printers or changes over time or the like are corrected or else this correction is confirmed.

An example of a format of the density calibration chart 16 is shown in FIG. 8. The density calibration chart 16 is formed by a plurality of squares (color patches) each of which is outputted (printed) by changing a dot % density in steps for each of K, C, M and Y between 0% and 100% by 5%. Further, in this chart, in order to display the range of density clearly, a color patch having a maximum density (100%) is provided at the head portion of the chart 16, and following this color patch, a color patch having a minimum density (0%) is provided. Thereafter, the color patches whose densities are between 95% and 5% are disposed in the order of their densities from high to low.

Further, in this embodiment, the distances between each of the color patches whose dot % densities are from 95% to 60% and each of the color patches which are adjacent to the aforementioned color patches in the longitudinal direction of the chart and whose dot % densities are from 90% to 55% are printed so that the larger the dot % density, the larger the distance. And the distances between each of the color patches whose dot % densities are from 50% to 10% and each of the color patches which are adjacent to the aforementioned color patches in the longitudinal direction of the chart and whose dot % densities are from 45% to 5% are printed at an equal distance (a small distance) regardless of dot % density. Moreover, K color which is at a constant density (a middle region) is printed on a chart portion other than the color patches.

In the first step of the color density adjustment, as will be described later, an operator measures the density of each color patch of the density calibration chart 16 in FIG. 8 by a densiometer 21, and transfers this metered value to the editing device 10 online. Or, the operator inputs the density value displayed on the densiometer 21 manually. On the basis of the density value transferred or manually inputted by the operator, the editing device 10 selects a density calibration 1-D table which will be described later for correcting intrinsic differences among individual printers or changes over time or the like.

Further, at the time of gray correction which is the second step of the color density adjustment, the color printer 12 outputs a gray correction chart 17 for correcting the fine gray balance for each of the C, M, and Y colors. Moreover, if the color densities have been adjusted completely by density calibration, theoretically, when C, M, and Y colors which are at predetermined densities are combined, a gray color which is approximated to a predetermined density of a black color can be obtained. However, in fact, the gray balance may deteriorate slightly and may be biased to a C, M, or Y color. Therefore, gray correction is carried out in order to correct this bias.

Figure 9:
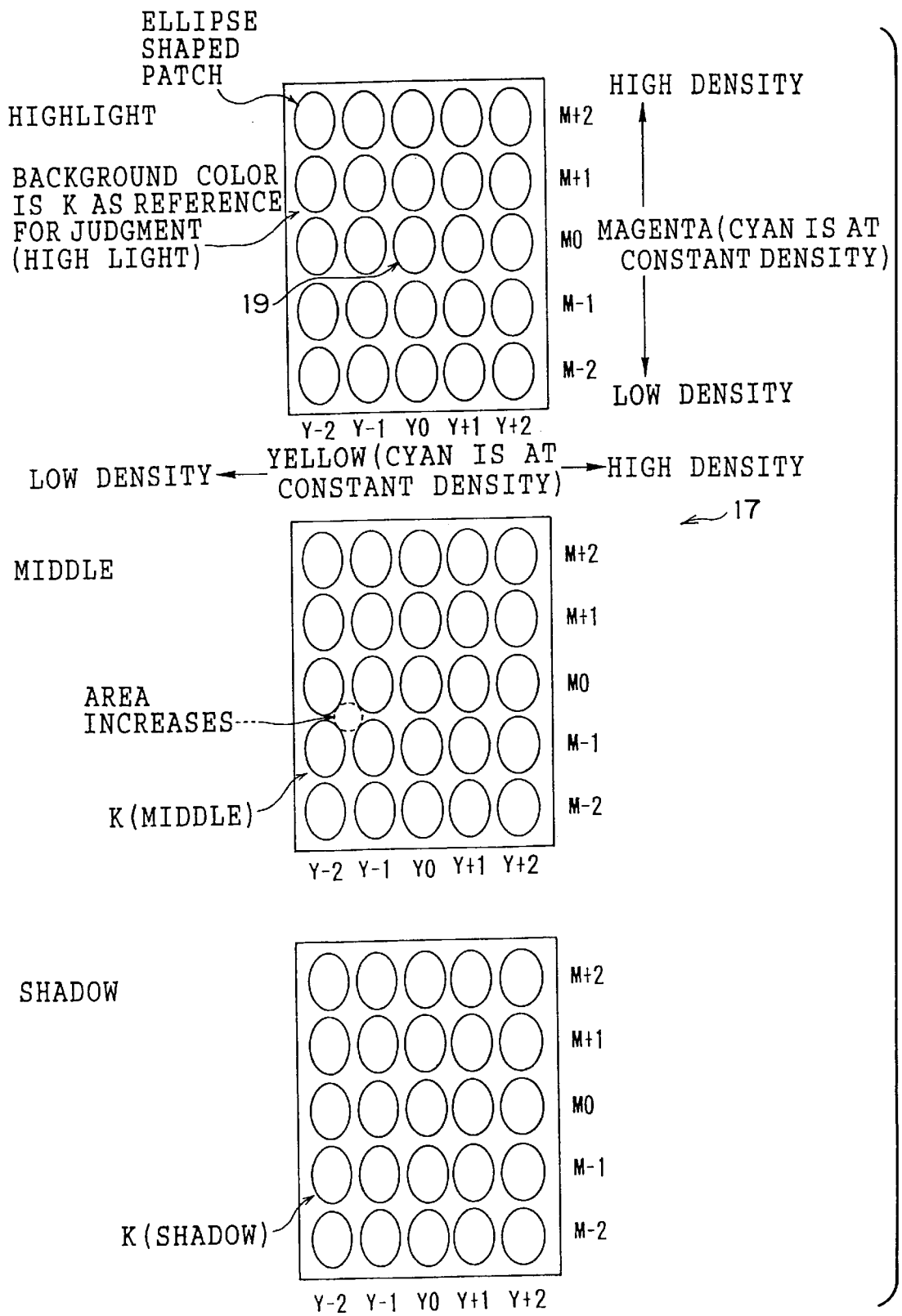
FIG. 9 is a view which illustrates an example of the formatting of a gray correction chart (a reference chart and a confirmation chart) according to the present embodiment.

An example of the formatting of a gray correction chart 17 is shown in FIG. 9. This gray correction chart 17 is provided with identical format charts (chart regions) for each of three density steps including highlight (low density), middle (intermediate density), and shadow (high density) .

A chart for each of the density steps has 25 ellipse shaped color patches which are formed by five lines in a longitudinal direction by five columns in a widthwise direction. These color patches in which cyan (C) is at a constant density $C_0$ (different in accordance with each density step) and densities of magenta (M) and yellow (Y) are varied respectively are combined.

More specifically, in order to realize a gray color which corresponds to each density step and is approximated to a black color at a predetermined density, a color patch 19 in which C at a cyan density $C_0$, M at a magenta density $M_0$, and Y at a yellow density $Y_0$ (which are different in accordance with each density step) are combined is disposed at the central portion of a chart in each density step. The higher the patches are positioned in the upper portion of the patch 19 in the longitudinal direction of the chart the higher the magenta densities. The lower the patches are positioned in the longitudinal direction of the chart the lower the magenta densities. The indices of magenta densities are referred to as $M_{-2}$, $M_{-1}$, $M_0$, $M_{+1}$, $M_{+2}$ from the lower portion of the chart in accordance with a position in the longitudinal direction of the chart. Moreover, the further the patches are positioned to the right side of the patch 19 in the widthwise direction of the chart the higher the yellow densities, while the further the patches are positioned to the left side of the patch 19 in the widthwise direction of the chart the lower the yellow densities. The indices of yellow densities in the widthwise direction of the chart are referred to as $Y_{-2}$, $Y_{-1}$, $Y_0$, $Y_{+1}$, $Y_{+2}$ from the left in accordance with a position in the widthwise direction of the chart.

The background color of the chart which is formed by these color patches is K color which is used as a reference for judging gray balance. The density of K color is formed by highlight, middle, and shadow in accordance with the chart for each of the density steps.

In the second step of color density adjustment, as will be described later, the operator judges visually the amount in which gray balance is biased, and inputs the amount of the bias to the editing device 10. The editing device 10 selects the gray correction 1-D table which will be described later for correcting the input amount of the bias of gray balance.

The color press 20 which outputs a lithographic film 22 as layout data in which print conditions or colors are corrected/ converted by the editing device 10 can be connected to the editing device 10. A final color print 26 is formed by the printing plate (PS plate) printing apparatus 24 by using the lithographic film 22.

Next, a detailed description of an example of the structure of a circuit of the editing device 10 will be given.

Figure 2:
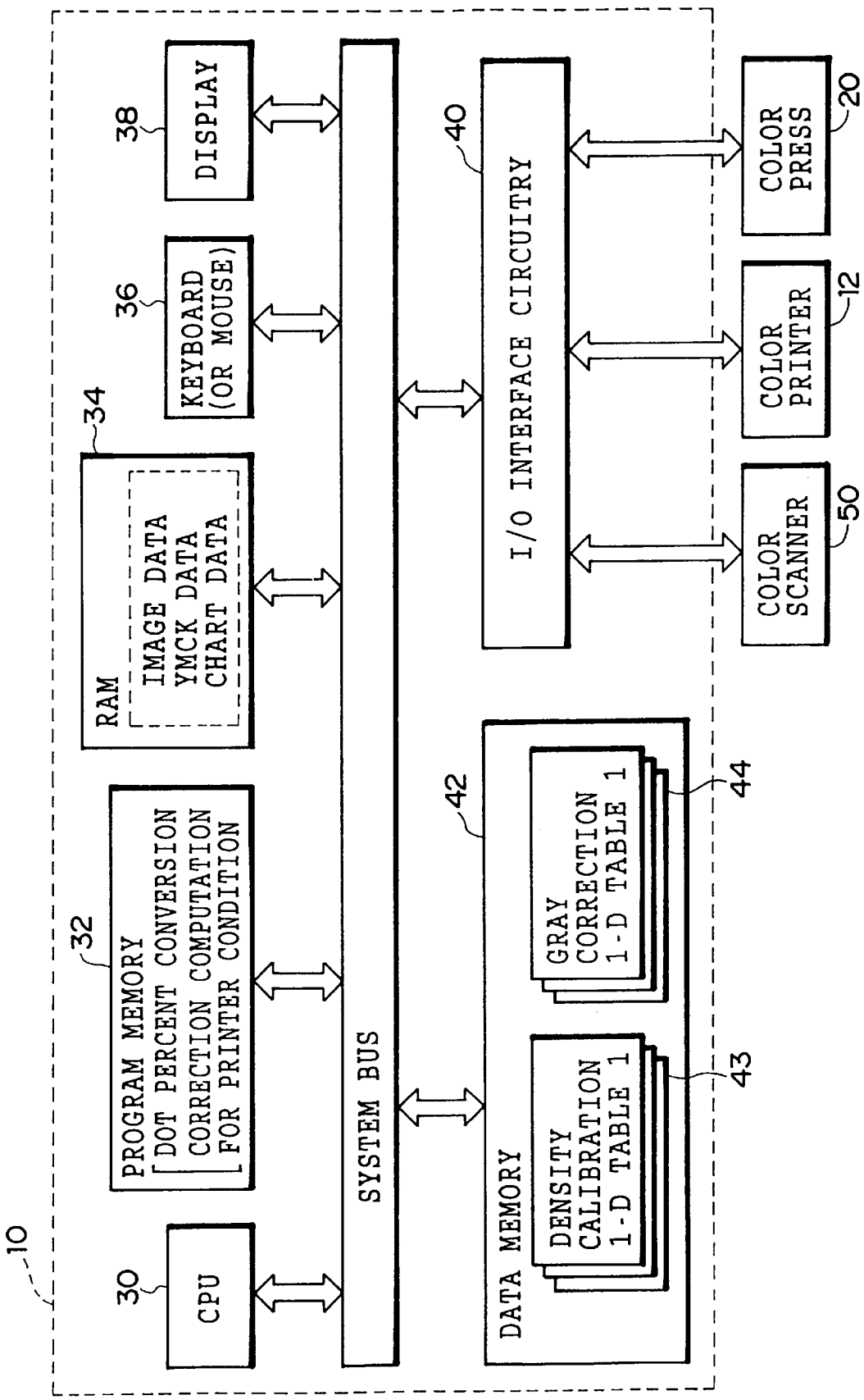
FIG. 2 is a circuit diagram of an editing device which functions as a high-ordered (host) device of a color printer according to an embodiment of the present invention.

As shown in FIG. 2, the editing device 10 comprises a CPU 30 which controls and manages the entire device on the basis of a predetermined program, a program memory 32 in which the aforementioned predetermined program is stored, RAM 34 which is used as a work area of the CPU 30 and as storage for input image data or bit map data, data memory 42 for storing therein data which is formed by nonvolatile memory, a key board (or a mouse) 36 as a means through which an operator can input data, a display for displaying processing results or the like, and an input/output interface circuitry 40 for controlling I/O interface with external I/O devices. Each of them is connected to each other via a system bus 46.

Printer condition correction data is stored in the data memory 42 for correcting intrinsic differences among the color printers 12 of the same type or changes over time or the like. The printer condition correction data includes a density calibration 1-D table 43 and a gray correction 1-D table 44, and each of them has a plurality of tables 1, 2,. . . N.

A color scanner 50 serving as an external input device, the color press 20 and the color printer 12 serving as an external output device can be connected to the I/O interface circuitry 40.

The color scanner 50 scans light on an image original optically, converts the reflected light from the document to respective image data for each of R(red), G(green), and B(blue), and inputs the data to the editing device 10 via the I/O interface circuitry 40. The input image data is interpreted into layout data by an interpreter (not shown) on the basis of the printed image and is stored in RAM 34. The image data may be stored in a storage medium such as optical magnetic disk, CD-ROM or the like. Moreover, the image data (RGB) is converted into the dot percent data Y, M, C, K, and is output to the color printer 12.

In addition to a main program for control, a sub routine for converting image data R, G, B read by the color scanner 50 into dot percent data for each of Y, M, C, and K, and a sub routine for converting chart data by the printer condition correction data are stored in the program memory 32.

Figure 3:
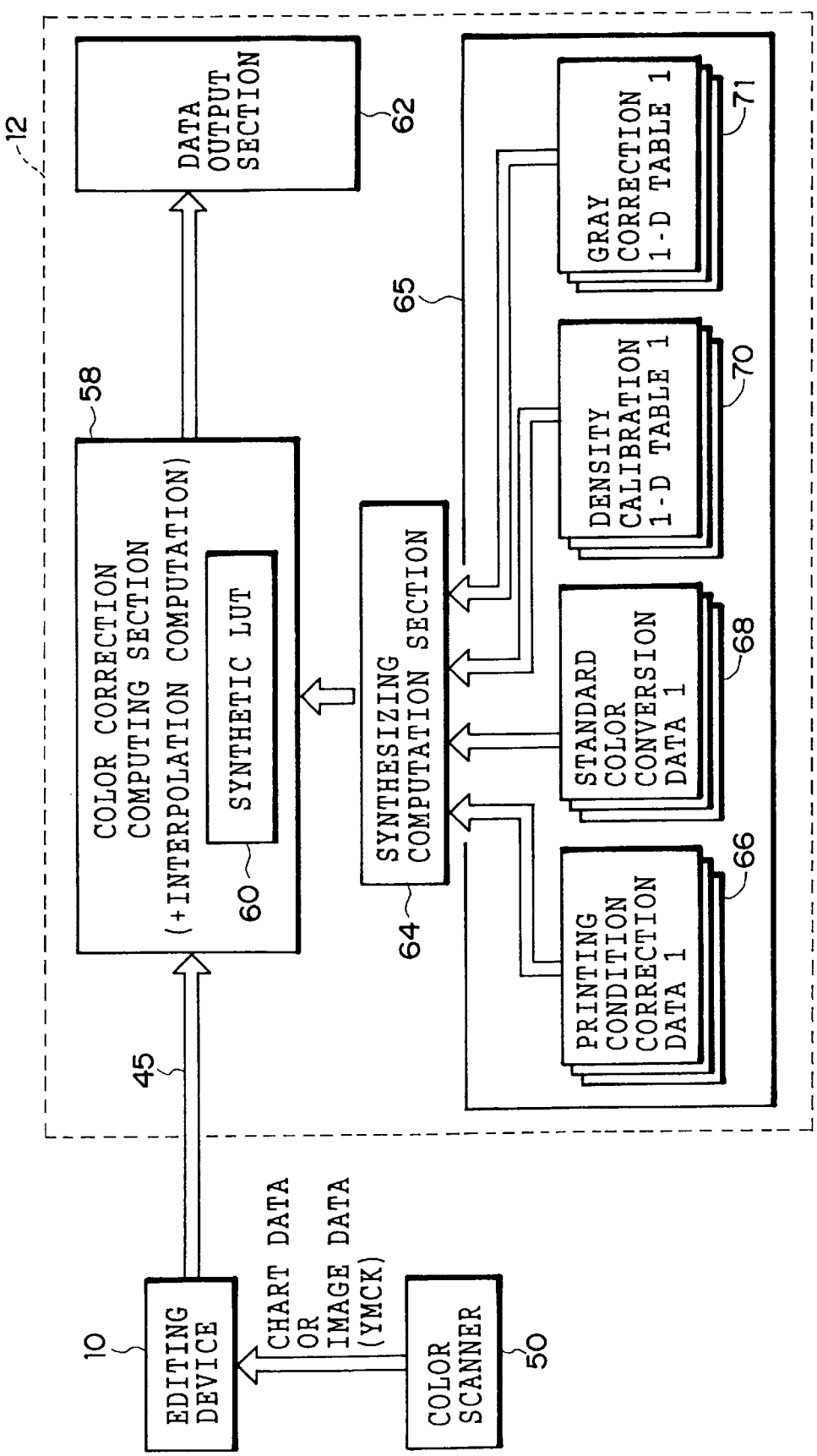
FIG. 3 is a block view of the color printer according to the present embodiment.

Next, a functional block view of the color printer 12 is shown in FIG. 3. As shown in FIG. 3, the color printer 12 includes a color correction computing section 58 which color-corrects the dot percent data Y, M, C, and K which is transmitted from the editing device 10 on the basis of a synthetic LUT 60, and a data outputting section 62 which outputs (prints) the image formed by data Y, M, C, and K which are color-corrected onto a recording sheet.

This synthetic LUT 60 is a four dimensional table which converts Y, M, C, and K data which have been prepared in advance in the writable/readable non volatile memory of the color printer 12, and forms one step of a synthetic table in order to improve the processing rate of the color correction conversion.

If the synthetic LUT 60 comprises tables which correspond to all of the gradations of the input data, for example, 256 gradations, the storage of the synthetic LUT 60 becomes excessively large. Ordinarily, the synthetic LUT 60 has a table which corresponds to ,for example, 33 gradations. In this case, in the color correction computing section 58, interpolation computation is carried out for the data from a half tone table which is not provided at the synthetic LUT 60.

Further, print condition correction data 66 for correcting Y, M, C, and K data in accordance with printing conditions during a color printing, standard color conversion data 68 for correcting colors of the image data and proofing, a density calibration 1-D table 70 for correcting color density difference, and a gray correction 1-D table 71 for correcting gray balance are stored in a memory 65. A plurality of types of tables 1, 2, . . . are prepared for this data. Moreover, the above-described printing condition correction data is data which corrects differences in color which are caused by the types of printing paper (e.g., coat paper, mat finished coat paper, non-coat paper and the like) which are used for the finally desired color print, and the types of ink for printing.

The density calibration 1-D table 70 and the gray correction 1-D table 71 of the color printer 12 are registered in the memory 65, as the same data as the density calibration 1-D table 43 and the gray correction 1-D table 44 which have been registered in the data memory 42 of the editing device 10.

Further, in accordance with the instruction from the editing device 10, a synthesizing computation section 64 synthesizes any data from the memory 65, the synthetic data is thereby stored in the synthetic LUT 60. When a color printing proof image 14 is outputted, the color printing proof image 14 is corresponded to a print target. Therefore, the synthesizing computation section 64 selects data respectively from the printing condition correction data 66, the standard color conversion data 68, the density calibration 1-D table 70, and the gray correction 1-D table. Accordingly, the selected four data are synthesized in the order of the data 66, 68, 70 and 71, and the synthetic LUT 60 is thereby formed .

In order to correct intrinsic differences or environmental differences among color printers, it is not necessary to correspond the color print proof image 14 to a print target. In this case, in the synthesizing computation section 64, the synthetic LUT 60 can be formed merely from any data from the density calibration 1-D table 70. Or, the synthetic LUT 60 can be formed merely from any data from the density calibration 1-D table 70, and the gray correction 1-D table 71.

The conversion using data 66, 68, 70, and 71 when Y, M, C, K are inputted is carried out as follows. Further, the output data using the conversion table are referred to as Y', M', C', K'.

In printing condition correction data 66, the conversion in which $Y'=I_{y'}(Y)$ $M'=I_m(M)$ $C'=I_c(C)$ K'=I_k(K)

is carried out. Namely, dot percent data for each of the converted colors is the function of dot percent data for the corresponding color only.

In the standard color conversion data 68, the conversion in which $$Y'=SM_y\ (Y, M, C, K)$$

$$M'=SM_m\ (Y, M, C, K)$$

$$C'=SM_c\ (Y, M, C, K)$$

$$K'=SM_k\ (Y, M, C, K)$$

is carried out. Namely, dot percent data for each of the converted colors is the function of dot percent data for all of the colors.

Figures 15A, 15B:
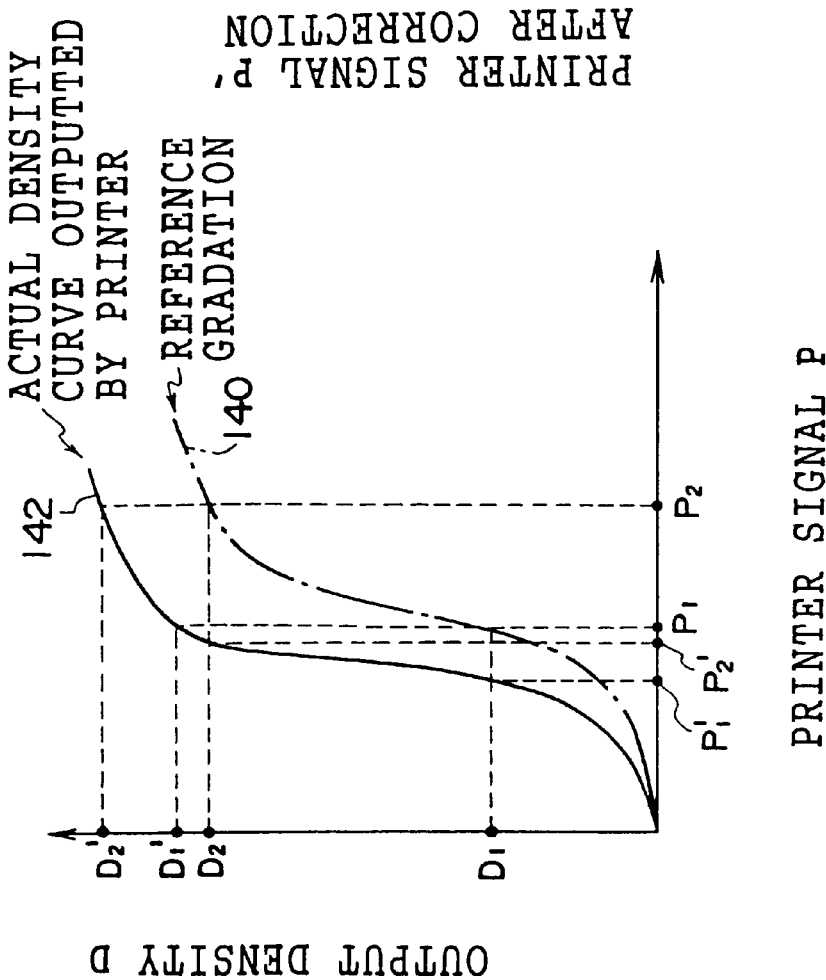
FIG. 15A is a view for explaining the need of the correction by using printer condition correction data, and a graph which represents the relation between the printer signal and the outputted density.
FIG. 15B is a view for explaining the need of the correction by using printer condition correction data, and a graph which represents the relation between the printer signal before correction and the printer signal after correction.

In the density calibration 1-D table 70, the conversion in which $$Y'=P_y\ (Y)$$

$$M'=P_m\ (M)$$

$$C'=P_c\ (C)$$

$$K'=P_k\ (K)$$

is carried out. Namely, dot percent data for each of the converted colors is the function of dot percent data for the corresponding color only. This functional relation corresponds to a conversion curve 150 which is shown in FIG. 15B.

In the gray correction 1-D table 71, the conversion in which $$Y'=Q_y\ (Y)$$

$$M'=Q_m\ (M)$$

$$C'=Q_c\ (C)$$

$$K'=Q_k\ (K)$$

is carried out. Namely, dot percent data for each of the converted colors is the function of dot percent data for the corresponding color only. This functional relation also corresponds to a conversion curve 150 which is shown in FIG. 15B.

When the aforementioned four conversions are synthesized at the synthesizing computation section 64, the conversion using the synthetic LUT 60 is carried out as follows;

$$Y' = CM_y(Y, M, C, K)$$
$$= Q_y(P_y(SM_y(I_y(Y), M, C, K)))$$
$$M' = CM_m(Y, M, C, K)$$
$$= Q_m(P_m(SM_m(Y, I_m(M), C, K)))$$
$$C' = CM_c(Y, M, C, K)$$
$$= Q_c(P_c(SM_c(Y, M, I_c(C), K)))$$
$$K' = CM_k(Y, M, C, K)$$

-continued
$$= Q_k(P_k(SM_k(Y, M, C, I_k(K))))$$

Figure 4:
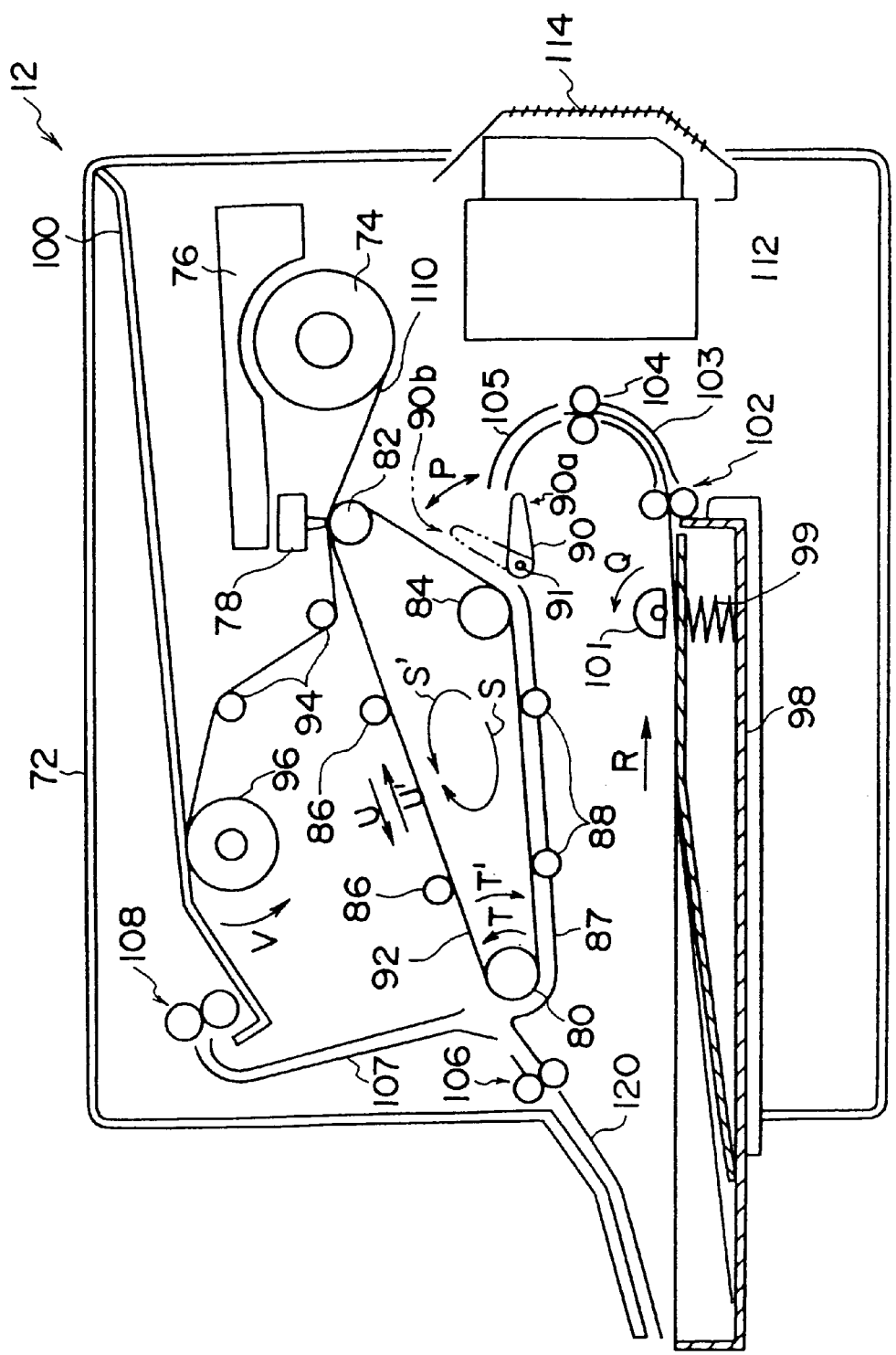
FIG. 4 is a structural view of a thermal printer serving as an example of the color printer according to the present embodiment.

Next, as an example of the color printer 12, the structure of a thermal printer is shown in FIG. 4. Further, in this thermal printer, a method is employed in which a two component color-developing system in which two papers, i.e., an intermediate paper and an image receiving paper, are used.

As shown in FIG. 4, the color printer 12 is housed in a housing 72. A paper tray 98 in which heat sensitive paper (or recording paper) before printing are set is disposed at the bottom of the housing 72. The bottom surface of the paper tray 98 inclines so as to form a mild slope whose height increases in the direction of R in which the paper is pulled out. The bottom surface of the paper tray 98 has a fixed height in the vicinity of the opening where the paper is pulled out. A spring 99 is provided at the lower portion of the bottom surface having a fixed height so as to press the heat sensitive papers upwardly.

A pull-out roller 101 which is formed in a semi-circular shape is disposed at the upper portion of the bottom surface having a fixed height so as to pull out the heat sensitive papers which have been set in the paper tray 98. As shown in this figure, in an ordinary state, the pull-out roller 101 is disposed so that the bottom surface of the pull-out roller 101 is substantially in parallel with the surface of the paper, and rotates in the direction of Q when the heat sensitive papers are pulled out. Due to this rotation, each of the heat sensitive papers is sequentially clamped by the arcuate portion of the pull-out roller 101 and the bottom surface of the paper tray 98 which is pressed by the spring 99, and moves in the direction of R in accordance with the rotation of this roller 101.

A pair of transport rollers 102 are provided at the pull-out opening of the paper tray 98 in order to transport the pulled out heat sensitive paper. An arcuate paper path 103 is provided at the side of the transport exit portion of the rollers 102 in order to lead the heat sensitive paper to the upper right diagonal portion in FIG. 4. A pair of transport rollers 104 which further transport the papers are disposed at the terminal end portion of the paper path 103. An arcuate paper path 105 is provided at the side of the transport exit portion of the pair of transport rollers 104 for leading the heat sensitive paper to the upper left diagonal portion in FIG. 4. The terminal end portion of the paper path 105 is disposed in a position so as to be in substantially the same position, with respect to the laternal direction of the color printer 12, as the pair of transport rollers 102 as shown in FIG.4. In this way, the heat sensitive paper which has been pulled out from the paper tray 98 describes a semi-circle, while it is pulled out from the terminal end portion of the paper path 105 in the direction which opposes the pulling out direction R.

A guide lever 90 is disposed near the terminal end portion of the paper path 105 in order to switch the transport direction of the heat sensitive paper. The guide lever 90 can rotate around the base axis 91 in the direction of P by a driving means which is not shown. Ordinarily, the guide lever 90 is situated at the position 90*a* when the heat sensitive paper is output from the terminal end of the paper path 105. When heat sensitive recording is started on the paper, the guide lever is rotated, and the heat sensitive paper is thereby switched over from the position 90*a* to the position 90*b*.

A bottom plate 87 which inclines so as to form a mild slope thereon is disposed at the left side of the guide lever 90, and has the same height at the right end portion thereof as the base axis 91 in FIG. 4. The heat sensitive paper which is output from the paper path 105 is led to the bottom plate 87 by the guide lever 90 set at the position 90a.

A transport belt 92, which is stretched by a belt driving pulley 80, a platen roller 82, and a roller 84, is disposed at the upper portion of the bottom plate 87. A torque is applied to the belt driving pulley 80 by a driving means (not shown) so that the driving pulley 80 rotates in the direction T' when the paper is pulled out, and in the direction of T when the heat sensitive recording is started. The transport belt 92 rotates in direction of S' or S so as to correspond to the rotation of the belt driving pulley 80 in the direction T or T'.

A path for pulling out the paper or the like is formed at the portion between the transport belt 92 between the belt driving pulley 80 and the roller 84, and the bottom plate 87. Two transport rollers 88 which abut the transport belt 92 are disposed on the path. The heat sensitive paper which is guided by the bottom plate 87 is clamped by the transport belt 92 and the transport rollers 88, and moves with the rotation of the transport belt 92.

Further, two transport rollers 86 which abut the transport belt 92 are provided at portions of the transport belt 92 between the platen roller 82 and the belt driving pulley 80. The heat sensitive paper during the heat sensitive recording is clamped between the transport rollers 86, and the transport belt 92 which rotates in the direction of S or S', and moves in the direction of U' or U.

A receiving section 120, which receives therein the leading edge portion of the heat sensitive paper during the heat sensitive recording, is provided near the transport belt 92 which extends in the direction U thereof. A pair of driving rollers 106 which withdraw/discharge the heat sensitive paper into/from the receiving section 120 is provided in the vicinity of the entrance of the receiving section 120.

Further, the bottom plate 87 is provided in the vicinity of the belt driving pulley 80 so as to form an arcuate shape in conformity with the configuration of the pulley 80. A discharging path 107, which is used as the discharge path for the heat sensitive paper after an image has been recorded thereon, is disposed above the terminal end portion of the arcuate bottom plate 87 in the direction which extends therefrom. At the terminal end portion of the discharging path, a pair of discharging rollers 108 withdraw the heat sensitive paper within the discharging path 107, and discharge the same into a discharging tray 100.

A support arm 76 is provided at the lower portion of the discharging tray 100. A thermal print head 78 which is structured by disposing heat elements or the like (not shown) in the main scanning direction is provided at the tip end portion of the support arm 76.

A supplying roll 74 which supplies an elongated ink sheet 110 to which inks used for thermal copying are applied for respective colors is disposed at the lower portion of the support arm 76. As shown in FIG. 5B, inks C, M, Y, K for thermal copying are applied to the ink sheet 110 in this order, on the area of the ink sheet 110 whose configuration and size substantially equal the image forming area of the heat sensitive paper on which images can be recorded.

A collecting roll 96 which takes up the ink sheet 110 is provided at the end portion of the discharge tray 100 which opposes to the supplying roll 74 located beneath the downstream of the discharge tray 100. When the collecting roll 96 rotates in the direction of V due to a driving means which is not shown, the ink sheet which is wound around the supplying roll 74 is sequentially taken up by the collecting roll 96. Transport rollers 94 which position the ink sheet at an appropriate position are disposed on the route along which the ink sheet 110 is collected.

Further, the ink sheet 110 is interposed between the thermal print head 78, and the transport belt 92 which is stretched by the platen roller 82. The heat sensitive paper is transported between the ink sheet 110 and the transport belt 92. Namely, the ink sheet 110 is disposed between the thermal print head 78 and the heat sensitive paper.

At the image recording time, each of the heating elements of the thermal print head 76 converts the electrical signal which corresponds to the image data into a heat signal, and the heat sensitive paper is transported in the direction of U. A chemical reaction occurs between the ink which has been applied to the ink sheet 110 and the heat sensitive material which has been applied to the heat sensitive paper, and an image which corresponds to the image data is recorded on the heat sensitive paper.

An air cooling window for taking in air for air-cooling is installed at the back of the housing 72 of the color printer 12. An air cooling section 112, in which a fan for air-cooling the device is assembled, is disposed in the air cooling window 114.

A perspective view illustrating a supplying-collecting system, and a transport system for the heat sensitive paper is shown in FIG. 5A.

As shown in FIG. 5A, the belt driving pulley 80 rotates in the direction of T, a heat sensitive paper 116 is transported in the direction of U, and an image is heat transferred from the ink sheet 110 onto the heat sensitive paper 116 by the thermal print head 78 through a heat transfer process so that the image is formed. Because image data are outputted as dot percent data C, M, Y, K, respectively, a collecting roll 96 rotates in the direction of V so that the corresponding ink among the inks C, M, Y, K which are applied to the ink sheet 110 which is shown in FIG. 5B is heat-transferred to the heat sensitive paper 116 at an appropriate position. (In the example shown in FIG. 5A, a heat-transfer of "K" is carried out.)

In order to heat-transfer all of the four inks C, M, Y, K to a single heat sensitive paper 116, after a single color has been heat-transferred, the heat sensitive paper 116 is restored to the position at the time when the image recording was started, and the ink sheet 110 is prepared for heat-transferring another color, and thereafter, yet another color is heat-transferred. In this way, the heat transfer process (image recording process) must be carried out four times in total. For this reason, the color printer 12 employs as a transfer system a so-called switch-back system. With reference to FIGS. 6A to 6E, a description of a transport path of a heat sensitive paper by this transport system will be given hereinafter. Further, in each figure, the transport path of the heat sensitive paper is shown as the thicker line.

As shown in FIG. 6A, the heat sensitive paper which is set in the paper tray 98 is pulled out therefrom due to the rotation of the pull-out roller 101, passes the paper paths 103 and 105 due to the rotations of the pairs of the transport rollers 102 and 104, and reaches to the guide lever 90 while the heat sensitive paper is describing a semi-circle. At this time, because the guide lever 90 is set at the position 90a, the heat sensitive paper which has been outputted from the paper path 105 is inserted into the path between the bottom plate 87 and the transport belt 92, and is forwarded in the direction of I along the bottom plate 87 by the transport belt 92 which rotates in the direction of S. When the heat sensitive paper, which has been forwarded in the direction of I, reaches the terminal arcuate portion of the bottom plate 87, it is raised up by the shape of the arc and is inserted into the extraction path 107 disposed above the terminal arcuate portion. As shown in FIG. 6B, the leading edge of the heat sensitive paper is then stopped directly before the extraction rollers 108. At this time, the guide lever 90 is switched from the position 90*a* to the position 90*b* so that the transport belt 92 rotates in the direction of S' which is the reverse direction of S.

In FIG. 6B, the heat sensitive paper is forwarded in the direction of I' which is the reverse direction to the time of pulling out the heat sensitive paper, along the transport belt 92 which rotates in the direction of S', and elevates along the guide lever 90 which has been switched to the position 90B. When the paper is inserted at the position at which the leading edge portion of the paper is nipped between the thermal print head 78 and the platen roller 82, the heat recording process is started. Moreover, at the time of the heat recording, the ink sheet 110 is positioned so that any ink area on the ink sheet 110 corresponds to the image recording area of the heat sensitive paper.

As shown in FIG. 6C, the heat sensitive paper during the heat recording advances in the direction of J, and in accordance with this advance, the ink sheet 110 is supplied from the supplying roller 74. At this time, an image data signal (any of C, M, Y, K) is transmitted from an unillustrated control section to the thermal print head 78 and is converted to the corresponding heat signal. By this heat signal, the ink on the ink sheet 110 and the material which is applied to the heat sensitive paper react with each other, and the image which corresponds to the color is formed on the heat sensitive paper. As shown in FIG. 6C, a portion of the leading edge portion of the heat sensitive paper which has been forwarded in the direction of J is drawn into the receiving section 120 by the driving rollers 106.

When the image for a particular color is recorded on the entire image forming area on the heat sensitive paper, the transport belt 92 rotates in the direction of S. Accordingly, the heat sensitive paper is transported in the reverse direction of the direction J from the position which is shown as the thicker line of FIG. 6C, and is received at the position before heat recording shown by the dotted line of FIG. 6C. At this point, the position of the ink sheet 110 is reset so that the ink area of the color to be recorded next is positioned so as to correspond to the recording area on the heat sensitive paper. In the same manner as described above, the transport belt 92 rotates in the direction of S' once again, and the thermal print head 78 converts the image data regarding the next color to the heat signal so that the image corresponding to this color is recorded on the heat sensitive paper. In this way, the heat recording process is repeated for each of the ink areas of the C, M, Y, K ink sheets 110 four times in total (i.e., a switch back system).

When images are recorded for each of the image data C, M, Y, K, the transport belt 92 again rotates in the direction of S. The heat sensitive paper is transported in the reverse direction of J from the position which is indicated by the dotted line in FIG. 6C, passes the pre-image recording position, and elevates via the discharge path 107. Thereafter, as shown in FIG. 6D, when the leading edge portion of the heat sensitive paper reaches the discharge rollers 108, the paper is discharged into the discharge tray 100 due to the rotation of the rollers 108.

When the discharging of the heat sensitive paper on which the image has been recorded into the discharge tray 100 has been completed, as shown in FIG. 6E, the guide lever 90 is switched from the position 90*b* to the position 90*a*, and the image recording work on the heat sensitive paper is completed.

Next, processes of work in the color conversion adjustment according to the present invention will be explained with reference to FIG. 7.

Figure 7:
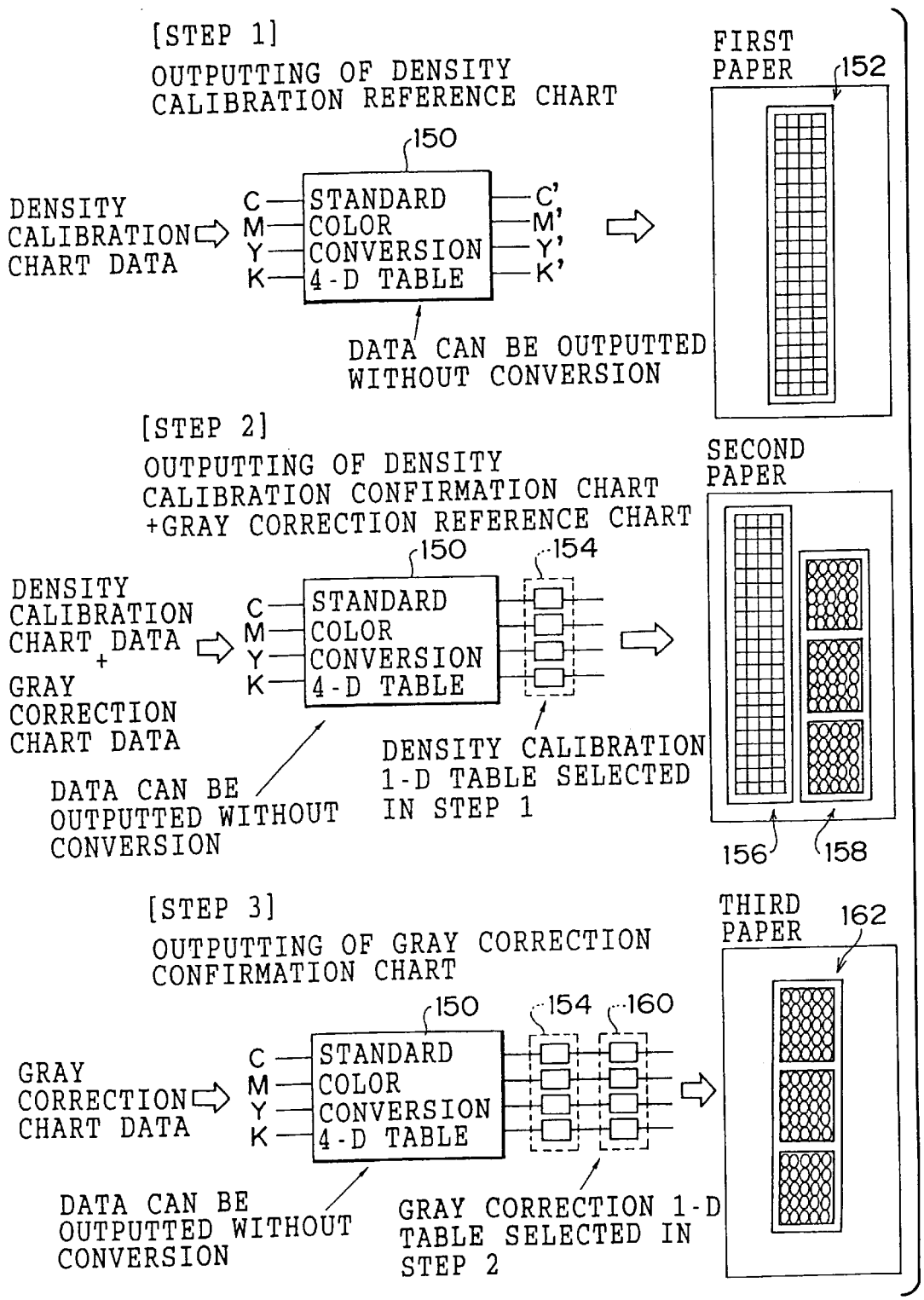
FIG. 7 is a view which illustrates the steps in which color density adjustment is carried out by the color printer according to the present embodiment, and illustrates a chart which is outputted (printed) on a recording sheet in each step.

As shown in FIG. 7, in step 1, a density calibration reference chart which is used as a reference for judging the density calibration is outputted. In the present embodiment, each of the charts is outputted by the following procedures.

The editing device 10 outputs to the color printer 12, the density calibration chart data which was converted from image data for each of C, M, Y, K to dot percent data. In the color printer 12, the inputted dot percent data is converted by using a standard color conversion 4-D table 150, and a density calibration reference chart 152 having the format specified in FIG. 8 is printed (outputted) on the first recording sheet on the basis of the converted data C', M', Y', K'.

The standard color conversion 4-D table 150 in FIG. 7 is a conversion table in which either density correction using the density calibration 1-D table and gray correction using the gray correction 1-D table is not carried out. Namely, the density calibration reference chart 152 is a standard chart which does not receive any of these corrections.

This standard color conversion 4-D table can be structured as a color correction conversion for implementing the correspondence of the color data from the table to a print target. However, the density calibration chart data can be printed (outputted) as a density calibration chart as it is without being converted by controlling with a system the reference values for the data which corresponds to the data which is inputted to a correction system, without using the standard color conversion 4-D table 150. Since the converted portions of the print target may be changed through a version-up or the like, preferably, the density calibration chart data is outputted without conversion by selecting an appropriate reference value.

An operator measures the density of each of the color patches of the density calibration reference chart 152 printed on a first recording sheet by the densiometer 21, and transfers the measured results of the density online to the editing device 10 or else inputs them through a key board manually.

Next, the editing device 10 computes the difference in density between the measured density for each of the color patches and the reference density for each of the color patches which has been stored previously in the memory, and selects the density calibration 1-D table which is optimal for correcting the density difference from the data 43 stored in the data memory 42 shown in FIG. 2. Or, a new density calibration 1-D table which is able to correct the obtained density difference is computed. In this case, the newly computed table is also registered in the memory 65 of the color printer 12.

Figure 13:
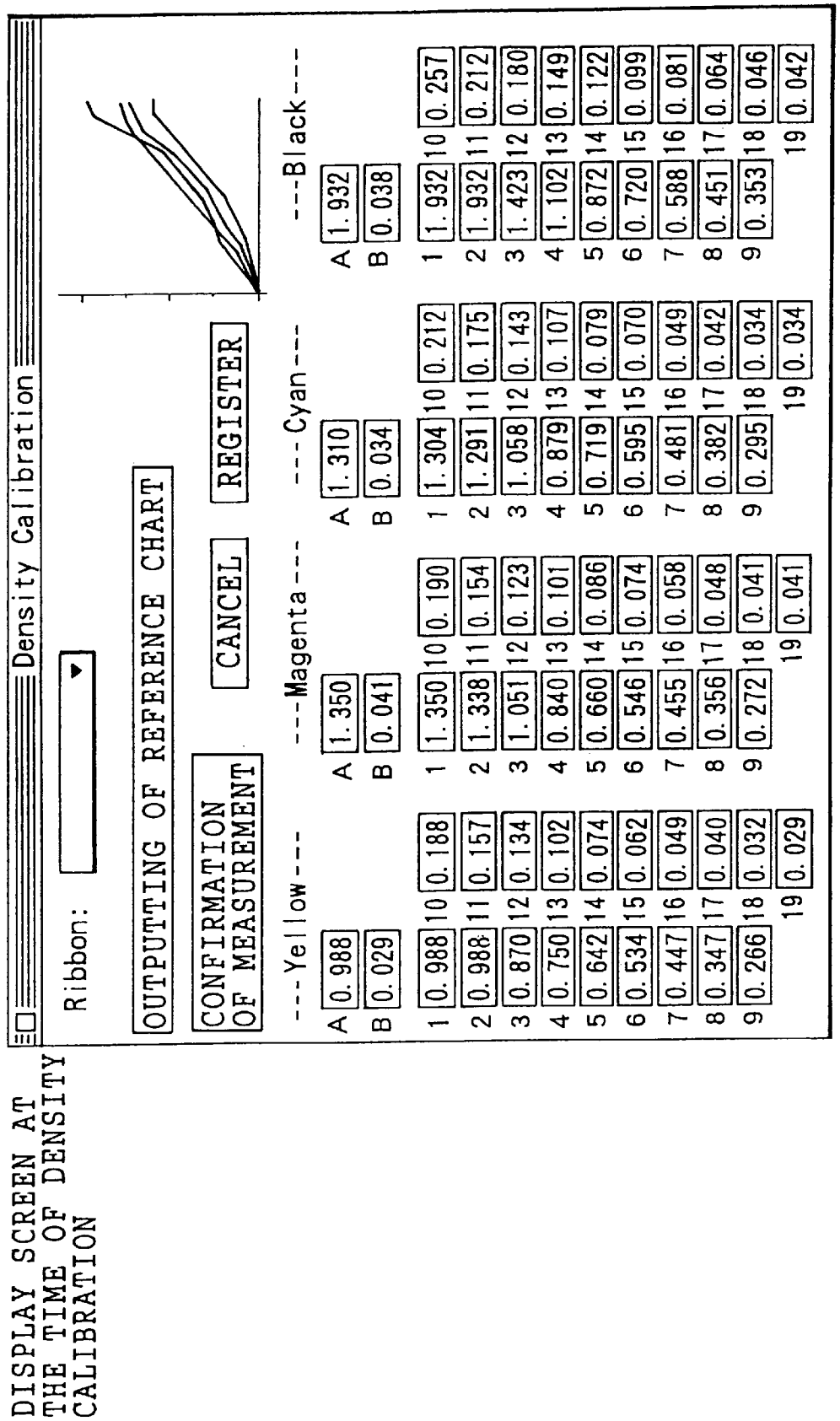
FIG. 13 is a view of the display screen of the editing device at the time of density calibration.

The selected density calibration 1-D table can be displayed as table function for each of the color Y, M, C, K on the display 38 of the editing device 10, for example, at the upper right portion of the display screen (see FIG. 13).

Next, in step 2 in FIG. 7, a density calibration confirmation chart 156 and a gray correction reference chart 158 are printed (outputted) together on a second recording sheet. In step 2, C, M, Y, and K data from the density calibration chart data and the gray correction chart data is converted using the standard color conversion 4-D table 150 and the density calibration 1-D table 154 which was selected in step 1, and is printed on the basis of the converted data thus obtained. Moreover, for the same reason described above, the data can be converted without converting the standard color conversion 4-D table, merely by using the density calibration 1-D table which was selected in step 1.

The operator judges whether or not the color density is equal to the reference density on the basis of the density calibration confirmation chart 156 which is displayed on the second recording sheet, and confirms whether or not color correction was carried out satisfactorily by the density calibration in step 1. In this confirmation work, the operator measures the dot % density for each color patches of the density calibration confirmation chart 156 with the densiometer 21, and confirms whether or not the measured results of the density are equal to the reference density. If the color density of the confirmation chart 156 is not equal to the reference density, in order to correct the density difference, the operator again selects a density calibration 1-D table 154 which was judged to be optimal, and repeats the operation.

The measured results of the density for each of the color patches in the step 2, or the aforementioned step 1 can be displayed on the display 38 of the editing device 10, for example, in the format specified in FIG. 13. In the example of this figure, the measured value of a density is outputted for each of the color patches (which are indicated by identification numbers A, B, and 1 to 19).

In the display screen in FIG. 13, a line whose identification numbers are A, B, and 1 to 9 (dot % is 55%) and a line whose identification numbers are 10 to 19 (dot % is 50%) are lined up separately. In the density calibration chart in FIG. 8, the distance between the color patches whose dot % density is 55% and the color patches whose dot % density is 50% is made to be larger than the distances among other color patches, and accordingly, the display screen and the chart can be corresponded clearly.

Further, the operator judges the bias of gray balance on the basis of the gray correction reference chart 158 displayed on the second recording sheet, and inputs the results to the editing device 10.

The following method for judging the bias of the gray balance is provided in the example of the chart in FIG. 9.

Namely, by comparing with the black color of the background color, the operator judges the color patch having the best gray balance (the color patch which is not biased to any of C, Y, and M) visually, from the color patches of the gray correction reference chart, for each of the density steps of highlight, middle and shadow. The operator selects the magenta density ($M_{-1}$ to $M_{+2}$) indices of the color patch having the best gray balance, and the yellow density ($Y_{-1}$ to $Y_{+2}$) indices of the color patch having the best gray balance, and inputs the difference (−2 to +2) resulted from each of $M_0$ and $Y_0$ to the editing device 10 as the bias of the gray balance. An example of the display screen inputted by the operator is shown in FIG. 14. In the example of the screen in this figure, in any steps of density, because the color patch having the best gray balance is ($M_0$ and $Y_0$), +0.0 is inputted to each of the density steps of Y and M.

After such differences have been input to the editing device 10, the editing device 10 selects a gray correction 1-D table which was judged to be optimal for correcting the inputted differences, from the data 44 which is stored in the data memory 42 in FIG. 2. Or, the device 10 can newly compute a gray correction 1-D table which is able to correct the selected difference. In this case, the device 10 also registers the newly computed gray correction 1-D table in the memory 65 of the color printer 12.

Next, in step 3 in FIG. 7, a gray correction confirmation chart 162 is printed on a third recording sheet. In step 3, C, M, Y, and K data from the gray correction chart are converted using the standard color correction 4-D table, the density calibration 1-D table 154 which was selected in step 1, and the gray correction 1-D table 160 which was selected in step 2, and the data is printed on the basis of the converted data.

For the same reason as the above description in steps 1 and 2, without using the standard color conversion 4-D table 150, the gray correction chart can be printed (outputted) on the basis of the converted data using only the density calibration 1-D table 154 which was selected in step 1 and the gray correction 1-D table 160 which was selected in step 2. In this case, two tables are synthesized by a synthesizing computing section 64, and forms a step of the synthetic LUT 60.

On the basis of the gray correction confirmation chart 162 which was displayed on a third recording sheet, the operator confirms visually that the bias has disappeared from the gray balance. Namely, the operator confirms that the color patch having the best gray balance for each density step is the color patch which is at the density ($M_0$ and $Y_0$), and finishes the color density adjustment operation. Moreover, if the operator judges that bias remains in the gray balance, the operator then newly selects a gray correction 1-D table for correcting this bias, and repeats the operation in the same manner as the steps which have been described above.

In this way, being different from the conventional method in which the density calibration confirmation chart 156 and the gray correction reference chart 158 are printed on different sheets, in accordance with the present embodiment, the density calibration confirmation chart 156 and the gray correction reference chart 158 are printed on the same recording sheet. Accordingly, the outputting time can be reduced and the number of sheets can be economized by one sheet. Namely, the color density adjustment work according to the present embodiment needs three sheets as compared to the conventional color density adjustment work in which four sheets were needed. As a result, the number of processes in the color conversion adjustment work and the cost of the materials used can be reduced to approximately ¾.

The gray correction chart according to the present embodiment, as shown in FIG. 9, uses a K color having a stable color layer which is used as the gray balance reference as a background color. Therefore, not only can the gray balance judging be performed accurately, but it can be performed without preparing a separate sheet on which the K color having a stable color layer which is used as the gray balance reference is outputted, and therefore operational efficiency is improved. Moreover, if the sheets on which the aforementioned charts are recorded are different, the gray balance of C, M, and Y may deteriorate, and the judgment on the gray balance may be incorrect. However, in accordance with the present embodiment, since the color patches and the background color K are printed on the same paper, the gray balance for C, M, Y, and K may deteriorate in the same direction. Accordingly, differences in the paper can be canceled out as a cause of difference in the gray balance judging reference. As a result, the gray balance can be judged accurately, all the time.

Further, in the present embodiment, because an ellipse shaped patch is used in the gray correction chart, the correct judgment of the gray balance can be greatly facilitated. For instance, as compared to the case in which a square or a rectangle patch having vertices is used, because it is possible to increase the area of the background portion, which are surrounded by four patches adjacent to each other, without decreasing the area of the patch itself, the comparison of the color of the patch and the background color K can be facilitated. Further, when a square or rectangle patch having vertices is used, in the vicinity of the vertices, especially in the background portion which is surrounded by four patches, the color density seems to be higher than it actually is because of an optical illusion, and may cause a misjudgment of the gray balance. However, when an ellipse shaped patch is used, this illusion can be reduced and a correct judgment of the gray balance thereby enabled.

Such effects as are described above is not limited to an ellipse shape, it can be achieved by using a patch which does not have a vertex which is formed by two lines intersecting, but is surrounded by a smooth closed curve having a curve ratio which is not negative to the outside portion thereof. Examples of such shapes as described above are illustrated in FIG. 10.

As shown in FIG. 10, other than an ellipse shaped patch, a normal circle, a configuration in which the vertices of a rectangle (a square) are made round or are smoothed using a quadric curve, a configuration in which the vertices of a rhomboid are smoothed, a configuration in which two semi-circles are linked to the sides of a rectangle (a square) opposing each other, and an oval can be listed. It should be assumed that the present invention is not limited to these examples.

Among the configurations which are shown in the examples in FIG. 10, as a configuration which increases the area of the aforementioned background portion of the chart and which effectively prevents an optical illusion, a normal circle is considered to be the most suitable configuration. However, by increasing the area of the patches to the maximum possible in accordance with the longitudinal configuration of the recording sheet, in the present embodiment, a color patch is formed into an ellipse shape in order to facilitate the comparison of the color patches and the background color K.

Figure 11:
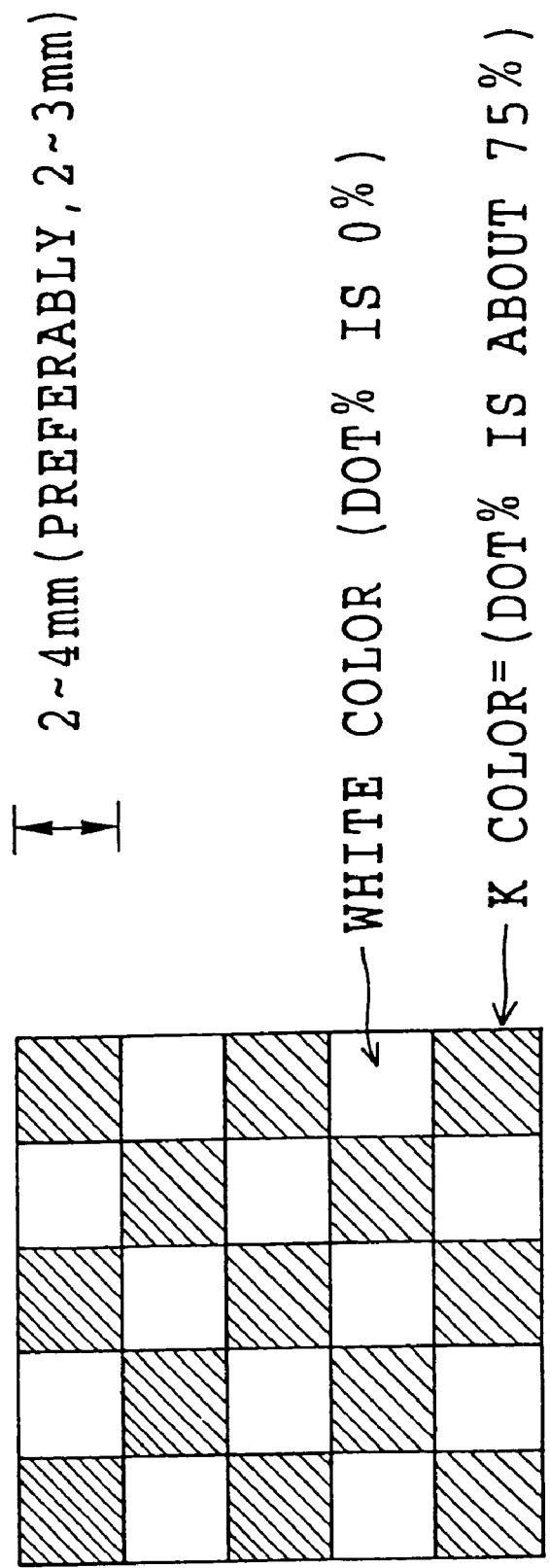
FIG. 11 is a view for explaining a checkered pattern printed (outputted) on the background portion of the chart.
Figure 12:
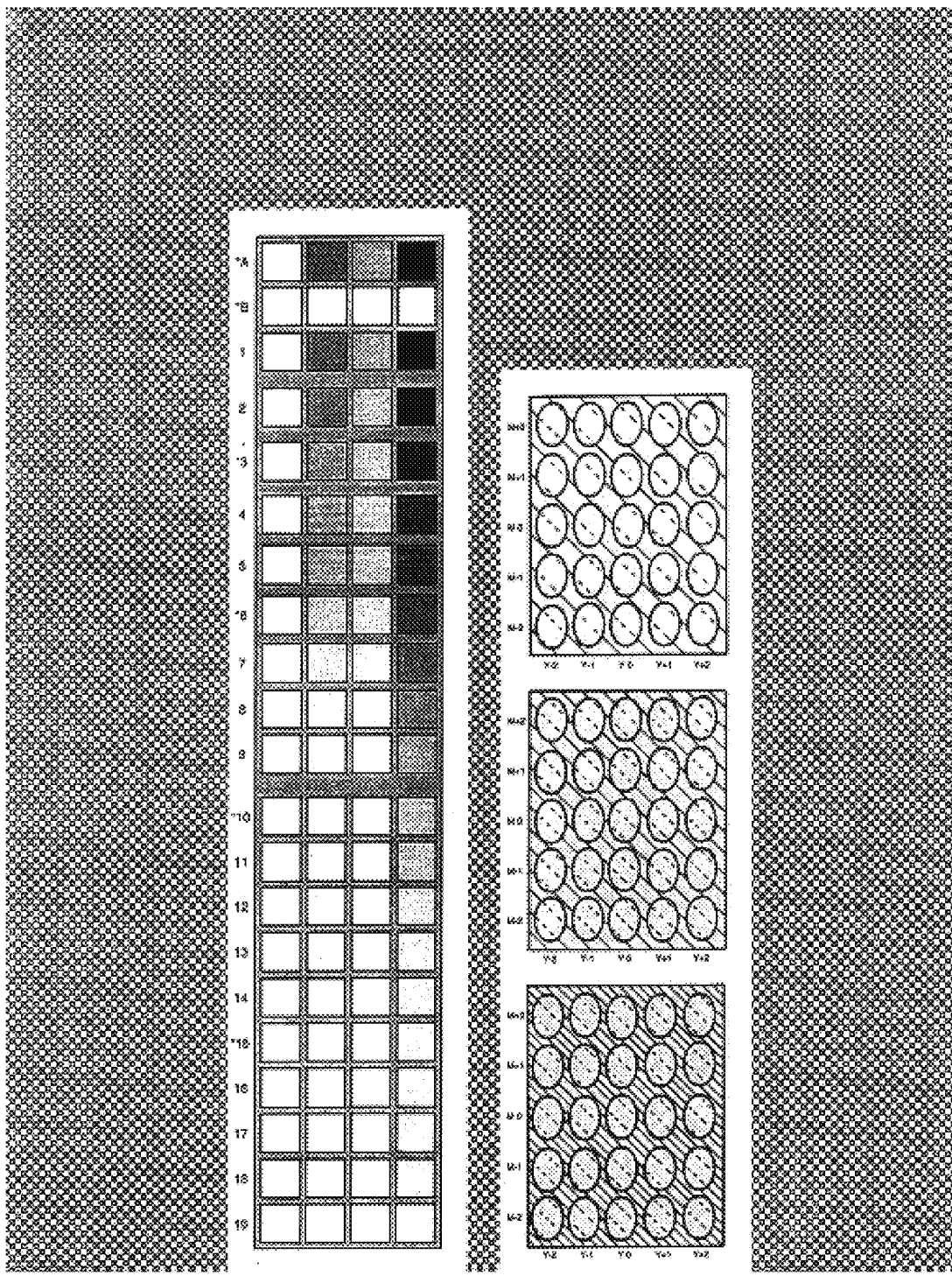
FIG. 12 is a view of a print of the density calibration confirmation chart and the gray correction reference chart in which a checkered pattern is printed on the background of the chart.

Further, in the present embodiment, as shown in FIG. 11, preferably, a so-called checkered pattern formed from white and the K color is printed on the background portion of the chart of the recording sheet which is used in Steps 1 to 3 of FIG. 7. A printed example of step 2 in FIG. 7 (the density calibration confirmation chart and the gray correction reference chart) is shown in FIG. 12 in which the background portion of the chart is printed (outputted) in the checkered pattern. Moreover, the image which is shown in FIG. 12 is the image in which the image on the heat sensitive paper is transferred onto a plain paper with the rear surface of the paper facing upward, which will be described later.

Because the load of the thermal print head 78 which is shown in FIG. 5 can be decentralized by printing such checkered patterns on the background portion of the chart, unevenness of the color density at each portion of the chart is reduced. As a result, the density adjustment can be carried out accurately. Namely, a time ratio (duty ratio) of the time power is supplied to the head against fixed scanning time of the thermal print head 78 can be made substantially uniform within the printed image screen.

For example, if no images are outputted on the background portion of the chart, the load of the thermal print head 78 in FIG. 5 (which is referred to as a head load, hereinafter) centralizes at the chart portion. Further, because heat remains in the thermal print head 78, the density of the image which is recorded after an image having a region whose density is high has been outputted tends to be higher. Inversely, the density of the image which is recorded after an image having a region whose density is low has been outputted tends to be lower. However, such unevenness can be prevented by printing a checkered pattern which is formed from white color and K color at an optional background portion of the chart.

In order to reduce such head load, another method in which the background portion of the chart is printed in a single color can be considered. However, unevenness is very noticeable when the background portion of the chart is printed in a single color. Because of the optical illusion due to the unevenness and the single color, there is a possibility that the visual judgment of the chart may be incorrect. However, in the case of a checkered pattern, because two colors are combined, optical illusion which is caused by unevenness on the image screen, and by the use of a single color can be prevented as much as possible.

The above described effects in which head load is decentralized and optical illusion can be prevented can be attained by forming not only a checkered pattern but also a pattern in which a white pattern unit and a single color (preferably, K color) pattern unit having a fixed size are combined substantially at equal area ratios. Preferably, the fixed size of the pattern is made smaller than the size of the patch (e.g., the length of a side of the patch). If the fixed size of the pattern is larger than the size of the patch, the unit of the pattern becomes excessively large, and the decentralization effect of the head load thereby decreases. Accordingly, because the background portion of the chart is too much noticeable due to the units of the pattern being excessively large, the visual judgment of the patch may be incorrect. Further, preferably, the size of the pattern for forming the background portion of the chart is more than a predetermined size. If the size of the pattern which is excessively small (in the case of the checkered pattern, for example, a cross cut pattern) is used for forming the background portion of the chart, the pattern becomes excessively fine, thereby causing optical illusion to viewers. Other than this type of checkered pattern, symbol, a repeated word or phrase in any language or alphabet may be used as the pattern, or what is known as a fractal diagram which resembles it self above a particular size may be used.

As shown in FIG. 11, the size of the cross cut checkered pattern must be set so that the length of a side of a checker square is about 2 to 4 mm, preferably, about 2 to 3 mm. When the length of the side is made smaller than 2 mm, the pattern becomes excessively fine, and unevenness is noticeable. Accordingly, there is a possibility that the visual judgment of the chart may be incorrect. Inversely, when the length of a side of a checker square is made larger than 3 mm, the pattern becomes rough, the patch size and the pattern size compete, and affects the visual judgment of the chart. Further, if the side is made larger than 4 mm, the decentralizing effect of the head load decreases.

In the present embodiment, the dot % densities for K color and white color of the checkered pattern are 75% and 0%, respectively. Therefore, the average density of the background portion of the chart is equal to 75÷2=37.5%, and it is within the range of the background density (20% to 40%) of an ordinary image. Accordingly, optical illusions can be prevented. It should be assumed that the K color of the checkered pattern can be set at another dot % density so that the average density thereof is between 20% and 40%.

In order to reduce the load on the thermal print head 78, not only the background portion but also the chart portion may be manipulated. For example, as shown in FIG. 8, the distance between the color patch whose dot % density is from 95% to 60% and the color patch adjacent to the aforementioned color patch in the longitudinal direction of the density calibration chart and whose dot % density is from 90% to 55% is printed so that the larger the dot % density, the larger the distance. Therefore, the higher the dot % density of the color patch, the longer the rest time of the head after the aforementioned color patch has been printed so that the head load can be reduced. In addition, if the dot % density is between 50% to 5%, because there is no need to rest the head due to the got % density being low, the distance between patches is made small.

As shown in FIG. 12, when the density calibration confirmation chart and the gray correction reference chart are printed on the same paper, each of the charts is disposed in a direction so that from the highlight portions to the shadow portions is the reverse of the other chart. Namely, in the example in FIG. 12, the density calibration confirmation chart is disposed so that the lower positioned patches have lower densities. The gray correction reference chart is disposed so that the lower positioned patches have higher densities. By disposing the charts alternately, the load on the head can be reduced.

The paper which is used for the density calibration reference/ confirmation chart and the gray correction reference/confirmation chart and for the color print proof image for the color density adjustment is, in reality, the one in which the heat sensitive paper having an image recorded thereon is transferred to the plain paper which is used for the actual color press. The transferring to the plain paper uses the heat sensitive paper 116 which is shown in FIG. 5 and which is also used as a laminate paper. A method is employed in which K, C, M and Y colors are printed sequentially in the inverse order so as to form a four colored negative image, and the four colored inverse image is transferred to the plain paper.

A method in which images formed in each of the colors K, C, M, Y are printed on four transparent films are transferred to a laminating paper one by one, forming a four colored negative image, and the four colored negative image is heat transferred to a plain paper is also used. In this way, because the heat sensitive paper is laminated with a heat sensitive material or the plain paper is lustered or delustered, the printed image that impresses the operator visually is different. Accordingly, the color print proof image is transferred to the plain paper used for the actual printing in order to maintain a standard level of accuracy in the color proof.

While the above is the color conversion adjustment method using the color printer 12 in conjunction with a preferred embodiment of the present invention, the present invention is not limited to the above and it is evident that many alternatives, modifications, and variations will be effected within the spirit and broad scope of the appended claims. For example, the present invention can be applied to cases in which color conversion is carried out not using the density calibration 1-D table and the gray correction 1-D table, or cases in which three types of color conversions or more is carried out. In the latter case, at two sequential color conversions , the previous color conversion confirmation chart and the following color conversion reference chart are printed on the same recording sheet.

In the embodiment of the present invention, a thermal printer was used as an example of a color printer. However, an ink jet printer, a xerographic printer, and a printer using a picturo photosensitive material can be used.

In the present embodiment, judgment of gray balance is carried out visually, in the chart outputting method according to the present invention, the color of each of the color patches of the gray correction chart is metered by a colorimeter, and the gray balance can be judged on the basis of the measuring results.

In the color printer 12, color correction has been carried out for dot percent data for each of K, C, M, Y. However, the present invention can be applied to cases in which color correction is carried out for R, G, B data. In this case, the synthetic LUT 60 operates as a three dimensional table.

The synthetic LUT 60 for color correction is created in the form of a table. However, for example, instead of a table, a neural network can be used for correction of color.

As described above, in accordance with the present invention, a gray correction chart, whose background portion other than the color patches is outputted at a black color, is used as a reference for judging a gray balance. Because there is no need to prepare another chart for comparing the color patches with the black color in order to judge the gray balance, work efficiency can be improved. Further, because the color patches and the black color are printed on the same paper, it is possible to cancel the differences in the gray balance judgment reference as being due to a difference in the paper, and accordingly, a superior effect can be provided in which the gray balance can always be judged with a high degree of accuracy.

What is claimed is:

1. A gray correction chart which is used for adjusting gray output balance of a color printer, comprising:
   a plurality of color patches which are outputted in a gray color in which at least two original colors, each of whose density is altered into a plurality of steps, are combined; and
   a background portion, which is a portion of said gray correction chart other than said plurality of color patches, said background portion being outputted as a black color.

2. A gray correction chart according to claim 1, wherein at least one portion, of the portion other than said gray correction chart, of a recording sheet on which said gray correction chart is outputted, is outputted in a color other than white.

3. A gray correction chart according to claim 1, wherein the portion other than said gray correction chart, of a recording sheet on which said gray correction chart is outputted, is outputted by combining a white pattern with a pattern having a single color other than white.

4. A gray correction chart according to claim 1, wherein the portion other than said gray correction chart, of a recording sheet on which said gray correction chart is outputted, is outputted in a checkered pattern which is formed from black and white colors.

5. A gray correction chart according to claim 1, wherein the configuration of said plurality of color patches are an encirclement by a smooth closed curve, and the curvature of said closed curve is not negative.

6. A gray correction chart according to claim 1, wherein the configuration of said plurality of color patches are formed into one of a circular shape, an ellipse shape, a rhomboid shape whose vertices are smoothed, an oval shape, or a rectangular shape which includes a square shape whose vertices are smoothed.

7. A color conversion adjusting method for a color printer, using:
   a gray correction chart which is used for adjusting gray output balance of the color printer, comprising:
   a plurality of color patches which are outputted in a gray color in which at least two original colors, each of whose density is altered into a plurality of steps, are combined; and
   a background portion, which is a portion of said gray correction chart other than said plurality of color patches, said background portion being outputted as a black color.

8. A color conversion adjusting method for a color printer, comprising:
   a first step which outputs a first chart for adjusting gray output balance, and which adjusts gray output balance on the basis of said first chart; and
   a second step which outputs a second chart for confirming the results of the adjustment in said first step, and which confirms said results of the adjustment in said first step on the basis of said second chart, wherein each of said first chart and said second chart comprises a plurality of color patches which are outputted in a gray color in which at least two original colors, each of whose density is altered into a plurality of steps, are combined, and a background portion, which is a portion of said first chart or said second chart other than said plurality of color patches, said background portion being outputted as a black color.

9. A color conversion adjusting method for a color printer according to claim 8, wherein said color printer is a color printer for forming a color print proof image.

10. A color conversion adjusting method for a color printer according to claim 8, wherein at least one portion, of the portion other than said first chart or said second chart, of recording paper on which said first chart or said second chart is outputted, is outputted in a color other than white.

11. A color conversion adjusting method for a color printer according to claim 8, wherein at least one portion other than said first chart or said second chart, of a recording paper on which said first chart or said second chart is outputted, is outputted in the checkered pattern which is formed from black and white colors.

12. A color conversion adjusting method for a color printer according to claim 8, wherein the configuration of said plurality of color patches are an encirclement by a smooth closed curve, and the curvature of said closed curve is not negative.

13. A color conversion adjusting method for a color printer according to claim 8, wherein the configuration of plurality of color patches are formed in one of a circular shape, an ellipse shape, a rhomboid shape whose vertices are smoothed, an oval shape, or a rectangular shape which includes a square shape whose vertices are smoothed.

14. A color conversion adjusting method for a color printer according to claim 8, further comprising:

a third step which is carried out before said first step, wherein a third chart for adjusting output of a plurality of original colors are outputted, and output of said plurality of original colors are adjusted on the basis of said third chart; and a fourth step wherein a fourth chart for confirming the results of the adjustment in said third step is outputted, and said results of the adjustment in said third step are confirmed on the basis of said fourth chart.

15. A color conversion adjusting method for a color printer according to claim 14, wherein said first chart and said fourth chart are outputted on the same recording sheet.

16. A color conversion adjusting method for a color printer according to claim 14, wherein at least each of one portion other than each of said first chart, said second chart, said third chart, and said fourth chart, of the recording sheet on which each of said first chart, said second chart, said third chart, and said fourth chart is outputted, is outputted in a color other than white.

17. A color conversion adjusting method for a color printer according to claim 14, wherein each of a portion other than each of said first chart, said second chart, said third chart, and said fourth chart, of the recording sheet on which each of said first chart, said second chart, said third chart, and said fourth chart is outputted, is outputted in a checkered pattern which is formed from black and white color.

18. A color conversion adjusting method for a color printer according to claim 14, wherein the configuration of said plurality of color patches are an encirclement by a smooth closed curve, and the curvature of said closed curve is not negative.

19. A color conversion adjusting method for a color printer according to claim 14, wherein the configuration of said plurality of color patches are formed in one of a circular shape, an ellipse shape, a rhomboid shape whose vertices are smoothed, an oval shape, or a rectangular shape which includes a square shape whose vertices are smoothed.

20. A color conversion adjusting method for a color printer according to claim 14, wherein each of said third chart and said fourth chart is outputted so that a plurality of color patches which are outputted by varying the density of each of a plurality of original colors including black in accordance with a plurality of density steps are lined up substantially in the order of density gradation, and color patches within a predetermined density range each having a value which is greater than or equal to a predetermined value of each of a plurality of original colors including black are lined up in a manner in which the higher the density of each of the color patches, the larger the distances among the color patches.

* * * * *